United States Patent
Liao et al.

(10) Patent No.: US 6,834,967 B2
(45) Date of Patent: Dec. 28, 2004

(54) OPTICAL SYSTEM FOR PROJECTION DISPLAY

(75) Inventors: Chia-Chen Liao, Hsin-Chu (TW);
Yi-Hao Kang, Hsin-Chu (TW);
Chu-Ming Cheng, Hsin-Chu (TW);
Keng-Han Chuang, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 0 days.

(21) Appl. No.: 10/604,837

(22) Filed: Aug. 21, 2003

(65) Prior Publication Data

US 2004/0109146 A1 Jun. 10, 2004

(30) Foreign Application Priority Data

Aug. 23, 2002 (TW) ..................................... 91213464 U

(51) Int. Cl.$^7$ ............................................. G03B 21/28
(52) U.S. Cl. ......................................... 353/98; 353/37
(58) Field of Search ............................ 353/98, 99, 30, 353/31, 37, 77, 78, 84; 359/443, 449, 453, 502, 726, 727, 838, 839, 853, 850, 857–859, 869; 349/30, 114, 145

(56) References Cited

U.S. PATENT DOCUMENTS

| | | | |
|---|---|---|---|
| 6,343,862 B1 | * | 2/2002 | Sawai et al. .................... 353/1 |
| 6,433,942 B1 | * | 8/2002 | Memezawa et al. ......... 359/833 |
| 2002/0067469 A1 | * | 6/2002 | Eguchi et al. ................ 353/31 |
| 2003/0030914 A1 | * | 2/2003 | Park .......................... 359/652 |

* cited by examiner

Primary Examiner—Judy Nguyen
Assistant Examiner—Rochelle Blackman
(74) Attorney, Agent, or Firm—Winston Hsu

(57) ABSTRACT

An optical system disposes a total reflection lens between a light valve and a projection lens. When a white light beam, emitting from a light source, passes through a color-generating device, the color of the light beam is sequentially converted into red, green, and blue primaries, and uniformed by an integrator. Then, the light beam impinges into the total reflection lens and is reflected to the light valve. The light valve reflects the light beam into a projection lens to be projected on a screen. Therefore, this invention increases the projection efficiency, and reduces the bulk and components of the optical system.

5 Claims, 4 Drawing Sheets

OPTICAL SYSTEM FOR PROJECTION DISPLAY

BACKGROUND OF INVENTION

1. Field of the Invention

The present invention relates to an optical system and, more particularly, to an optical system for use in a projection display.

2. Description of the Prior Art

The development of electro-optical technology is tending to visualize information, and the key factor of determining projection-type imaging quality usually depends on the quality of an optical system of a projection display. Considering the production cost, how to produce a portable projection display with high clarity for promoting the market competition is always the focus of research and development in the electro-optical industry.

Referring to FIG. 1, an optical system 10 of a conventional projection display includes a light source 11 for producing a white light beam. The light beam is reflected by a reflector 12 and converges onto a color-generating device 13, such as a color wheel. The color-generating device 13 comprising a series of red, green, and blue filters sequentially converts the color of the light beam into red, green, and blue primaries when the light beam passes through it. A first condenser lens 141 and a second condenser lens 142 after the color-generating device 13 are used for converging and transmitting the light beam. The light beam is reflected upward by a first mirror 151 for passing through a third condenser lens 143, and then reflected by a second mirror 152 for passing through a fourth condenser lens 144 to impinge onto a digital micro-mirror device (DMD) 16. The DMD 16 has a two-dimensional array of micro-mirrors. Each micro-mirror with the tilt angles about ±12 degree varies the angle of reflection of the light beam reflected therefrom and thereby causes on/off state. When the microminor switches to on-state, the light beam is reflected to enter a projection lens 17 for projecting on a screen (not shown). When the micro-mirror switches to off-state, the light beam is reflected away from the projection lens 17 to avoid projecting on the screen. Therefore, the necessary light beam can be properly selected to be projected on the screen.

As shown in FIG. 2, the third condenser lens 143 of the conventional optical system 10 is generally as close as possible to the optical axis between the DMD 16 and the projection lens 17, so as to form a more compact optical system 10. However, parts of the light beam from the third condenser lens 143 to the second mirror 152 will very possibly be obstructed by the projection lens 17 relatively. Thus, this obstruction causes a mechanical and optical interference such that the illumination efficiency of the projection display is degraded. To avoid the obstruction in the conventional projection display, the projection lens 17 moves toward the screen 18 to a position 17', or the third condenser lens 143 moves outward to a position 143 Therefore, all above-mentioned adjustments elongate the light path of the optical system 10 and result in a bulky projection display.

In addition, the light beam in the conventional optical system 10 passes through three condenser lens 141, 142, and 143 as well as two mirrors 151 and 152 to impinge onto the DMD 16. The conventional optical system 10 needs excessive components and results in not only a complex optical structure but increasing the production cost, elongating the light path, and enlarging the bulk of the optical system 10. Therefore, there are many defects in the conventional projection display needed to be improved.

SUMMARY OF INVENTION

An objective of the present invention is to provide an optical system that has a total reflection lens for avoiding the interference to raise the projection efficiency and image quality.

Another objective of the present invention is to provide an optical system that reduces some optical components to simplify and compact the whole projection display.

To achieve the above objectives, the optical system of the present invention disposes a total reflection lens between a light valve and a projection lens. When a white light beam from a light source passes through a color wheel, the color of the light beam is sequentially converted into red, green, and blue primaries, and uniformed by an integrator. Then, the light beam impinges into the total reflection lens and is reflected to the light valve therefrom. The light valve reflects the light beam into a projection lens to be projected on a screen. Therefore, this invention increases the projection efficiency and reduces the volume and components of the optical system.

DETAILED DESCRIPTION

Further features and advantages of the present invention, as well as the structure and operation of the embodiments of the present invention, are described in detail below with reference to the accompanying drawings.

Figure 1:
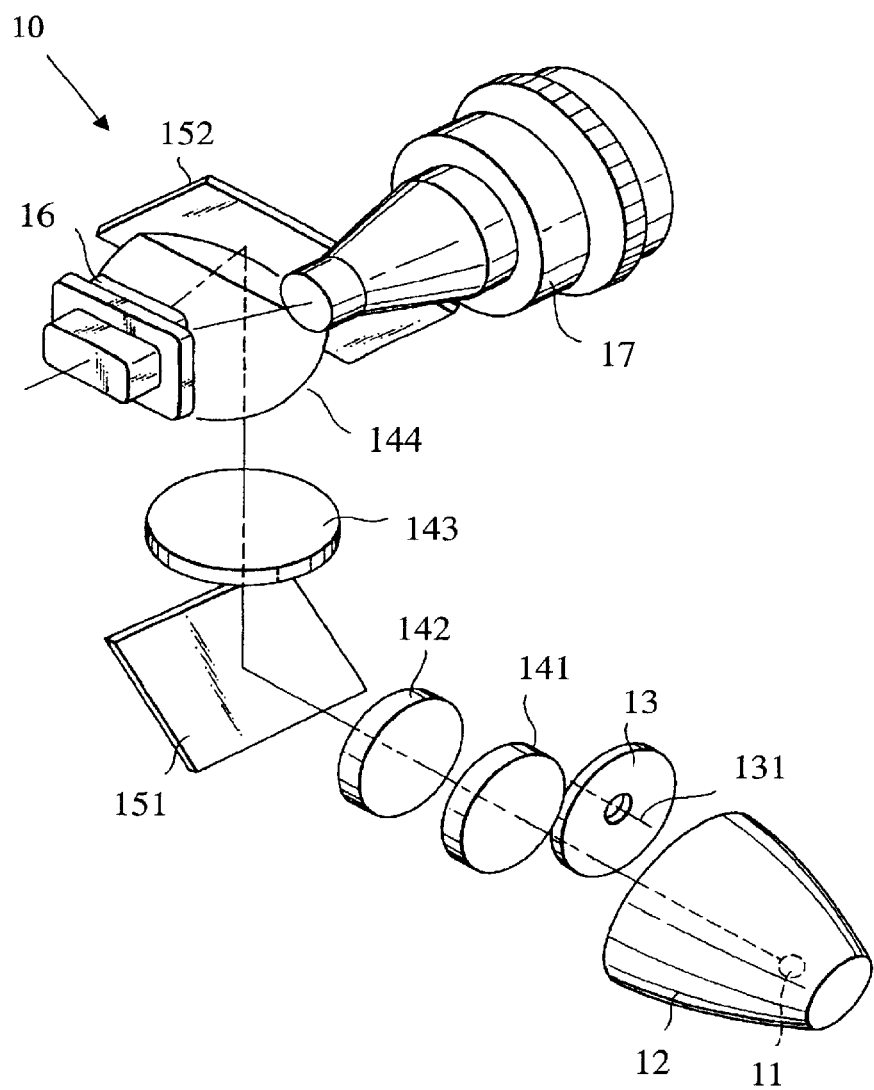
FIG. 1 is a schematic view showing an optical system of a conventional projection display.
Figure 2:
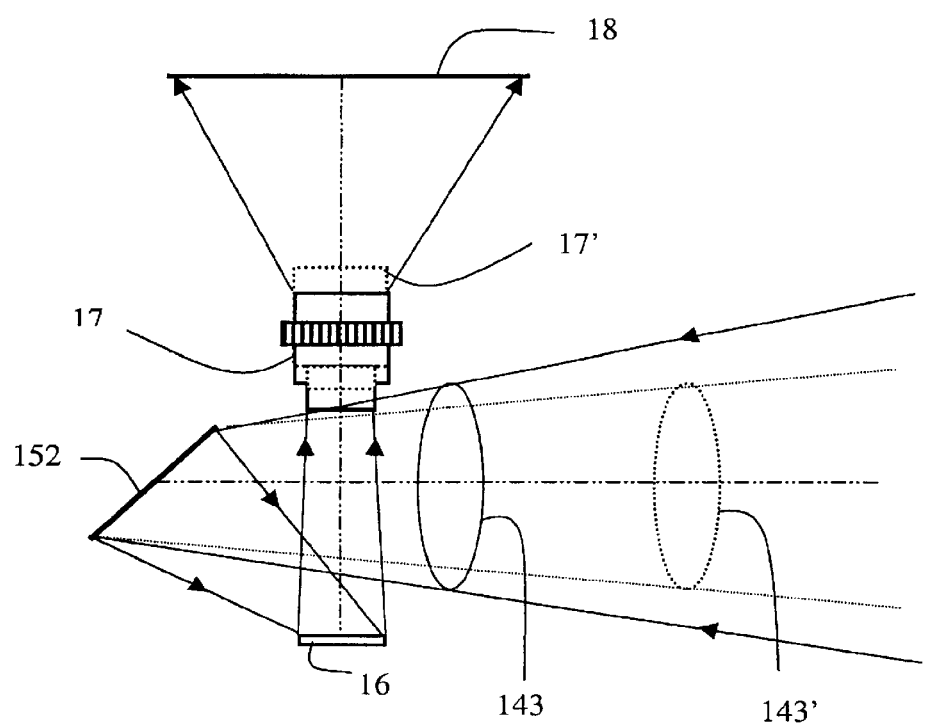
FIG. 2 is a schematic view showing that interference is formed and solved in a conventional projection display.
Figure 3:
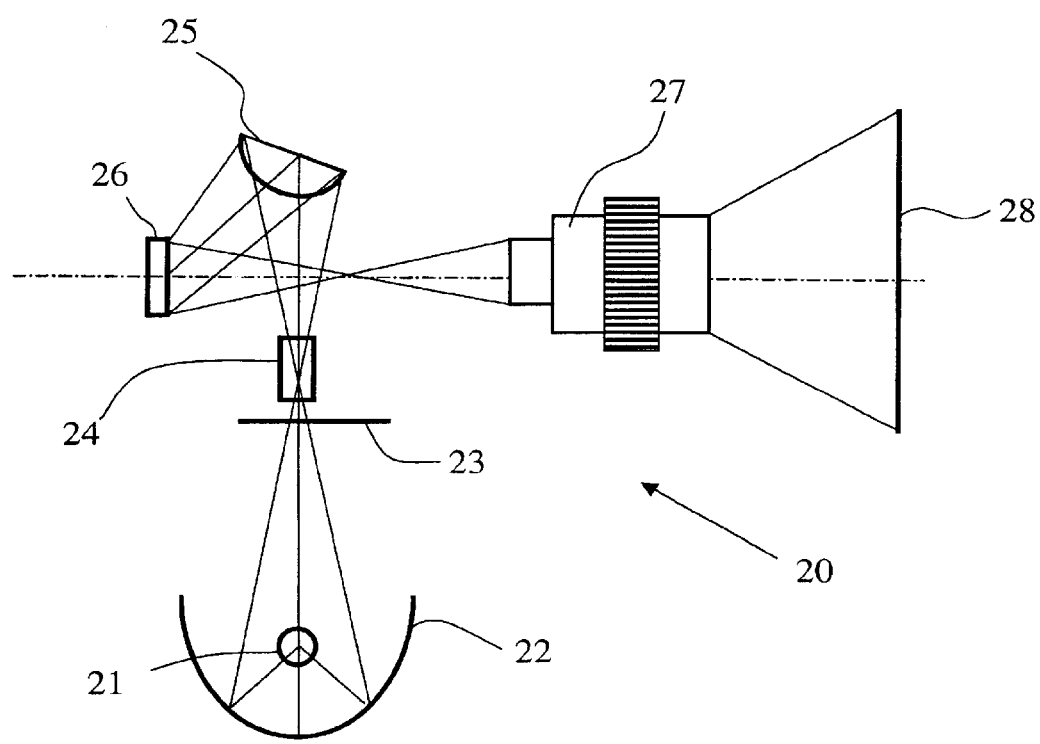
FIG. 3 is a schematic view showing the projection display of the preferred embodiment of the present invention.

Referring to FIG. 3, an optical system 20 of the present invention primarily comprises an illuminating system, a total reflection lens 25, and an imaging system. The illuminating system includes a light source 21, a reflector 22, a color-generating device 23, and an integrator 24, such as a rod integrator. And the imaging system includes a light valve 26 and a projection lens 27.

In the optical system 20, the light source 21 emits a white light beam. The light beam is reflected by the reflector 21 and converges onto the color-generating device 23 which has a sires of red, green, and blue filters. The color-generating device 23 sequentially converts the color of the light beam into red, green, and blue primaries when the light beam passes through it. Then, the light beam goes through the integrator 24 to uniform brightness and is transmitted into the total reflection lens 25. The light beam reflected by the total reflection lens 25 impinges onto the light valve 26, such as DMD. When the light valve 26 switches to on-state, the light beam is reflected to enter the projection lens 27 for projecting on a screen 28. When the light valve 26 switches to off-state, the light beam is reflected away from the projection lens 27 to avoid projecting on the screen 28.

In the optical system 20 of the present invention, the total reflection lens 25 is disposed after the integrator 24 along the light path of the light beam emitted from the light source 21. The total reflection lens 25 receives the light beam from the illuminating system, and then reflects the light beam to the light valve 26 and projection lens 27 of the imaging system. Finally, the light beam projects on the screen 28. Thus, the optical system 20 of the present invention is constructed. Therefore, the optical system 20 has no need to use so many condenser lenses and mirrors to reduce its production cost and bulk.

Figure 4:
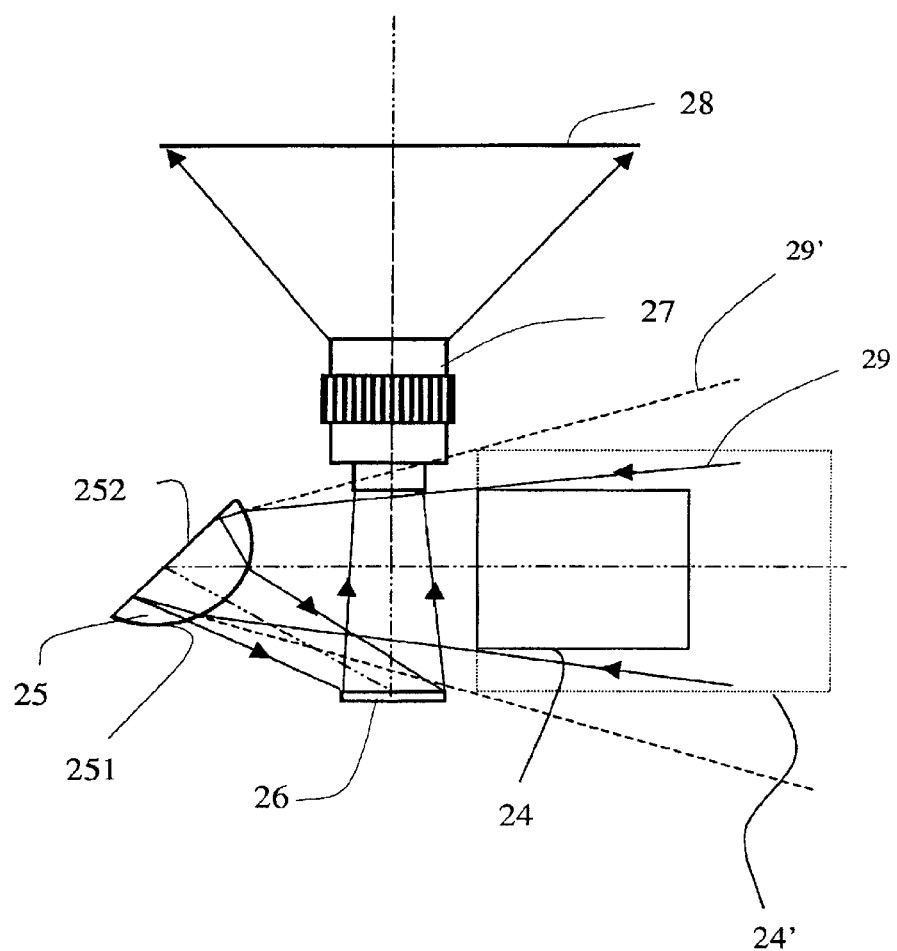
FIG. 4 is a schematic view showing that interference is solved

Referring to FIG. 4, the total reflection lens 25 of the present invention has a transparent surface 251 and a total reflection surface 252 formed with total reflecting coating or a reflection mirror. According to Snells Law, when the light beam 29, shown as the continue line, enters the transparent surface 251, it will be deflective to the optical axis of the total reflection lens 25; when the light beam 29 continuously impinges onto the total reflection surface 252 then, it will be reflected out of the transparent surface 251 with a deflective angle onto the light valve 26. However, as to the light beam with the same incident angle impinging onto the light valve 26, the light beam 29 of the convention optical system need bigger incident angle, shown as the dotted line. Therefore, the convention optical system needs a bigger integrator 24 and very possibly causes the mechanical interference. In contrast, by means of the total reflection lens 25, the present invention can converge the light beam and only needs the smaller integrator 24. Thus, the optical system 20 can avoid producing the mechanical interference, the whole bulk of the optical system 20 can be shrunk, and the projection display becomes more compact too. Furthermore, the total reflection lens 25 raises 2%–5% reflection efficiency than the conventional optical system. In alternative embodiment, a concave mirror could be used instead of the total reflection lens 25.

The present invention has been described using exemplary preferred embodiments. It will be obvious that the same may be varied in many ways. Such variations are not to be regarded as a departure from the spirit and scope of the invention, and all such modifications and arrangements as would be obvious to one skilled in the art are intended to be included within the scope of the following claims.

What is claimed is:

1. An optical system for projection display comprising:
   a light source for producing a light beam;
   an imaging system having a light valve and a projection lens; and
   a total reflection lens having a transparent surface and a total reflection surface, the transparent surface facing the light source;
   wherein the transparent surface receives and converges the light beam from the light source and then the light beam is impinged onto the total reflection surface,
   wherein the total reflection surface reflects the light beam to the transparent surface and then the transparent surface converges the light onto the light valve which reflects the light beam into the projection lens.

2. The optical system of claim 1, wherein the total reflection surface is a total reflecting coating.

3. The optical system of claim 1, wherein the total reflection surface is a mirror.

4. The optical system of claim 1, wherein an integrator is placed between the total reflection lens and the light source.

5. The optical system of claim 1, wherein the total reflection lens is a concave mirror.

* * * * *